Aug. 11, 1936.  L. A. CARTER  2,050,245
CHANGE SPEED TRANSMISSION
Filed May 31, 1935    5 Sheets-Sheet 1

INVENTOR:
Lionel A. Carter
by Carter Carter Gravely
HIS ATTORNEYS.

Patented Aug. 11, 1936

2,050,245

UNITED STATES PATENT OFFICE 2,050,245

CHANGE SPEED TRANSMISSION

Lionel A. Carter, Webster Groves, Mo.

Application May 31, 1935, Serial No. 24,313

21 Claims. (Cl. 192—12)

This invention relates to change speed transmissions, particularly change speed mechanisms of the kind shown and claimed in my pending application Serial No. 721,974, filed April 23, 1934, wherein the desired selected speed changes are obtained by fluid operated clutches controlled by a single manually operable valve and a second manually operable valve is provided for starting and stopping said mechanism. The present invention has for its principal objects to preserve all of the advantages of the above type of fluid operated change speed transmission and, at the same time, enable the desired speed changes to be quickly, easily and safely made without requiring the start-and-stop valve to be manually set at stop position for each speed change and to establish desirable conditions for the operation of the positive clutches in the stop position of said valve. Other objects are simplicity and cheapness of construction and compactness of design. The invention consists in providing connections between the positive clutches and means associated with the start-and-stop valve, whereby movement of said clutches to effect the speed changes automatically creates favorable conditions for engagement and disengagement of said clutches in both start and stop positions of said valve; and it also consists in the parts and in the construction, combinations and arrangements of parts hereinafter described and claimed.

In the accompanying drawings, which form part of this specification and wherein like symbols refer to like parts wherever they occur, Fig. 5 is a vertical transverse section on the line 5—5 in Fig. 3, Fig. 6 is a fragmentary vertical section through the lower, front portion of the headstock, the section being taken through the start-and-stop valve on the line 6—6 in Fig. 2, Figs. 7, 8 and 9 are sections through the operating cylinder of one of the positive clutches on the line 7—7 in Fig. 3, showing the positions of the piston when said clutch is engaged at one end, disengaged and engaged at the other end, Fig. 14 is a similar view of the outer peripheral surface of said valve sleeve.

In the accompanying drawings, the present invention is illustrated in connection with a fluid operated change speed transmission of the kind shown in my pending application Serial No. 721,974 and embodied in the geared headstock of an engine lathe comprising a bed 1, a headstock housing 2, a carriage 3, a lead screw 4, a feed rod 5 and a housing 6 containing a quick change mechanism (not shown) for driving said lead screw and said feed rod at different selected speeds.

Figure 16:
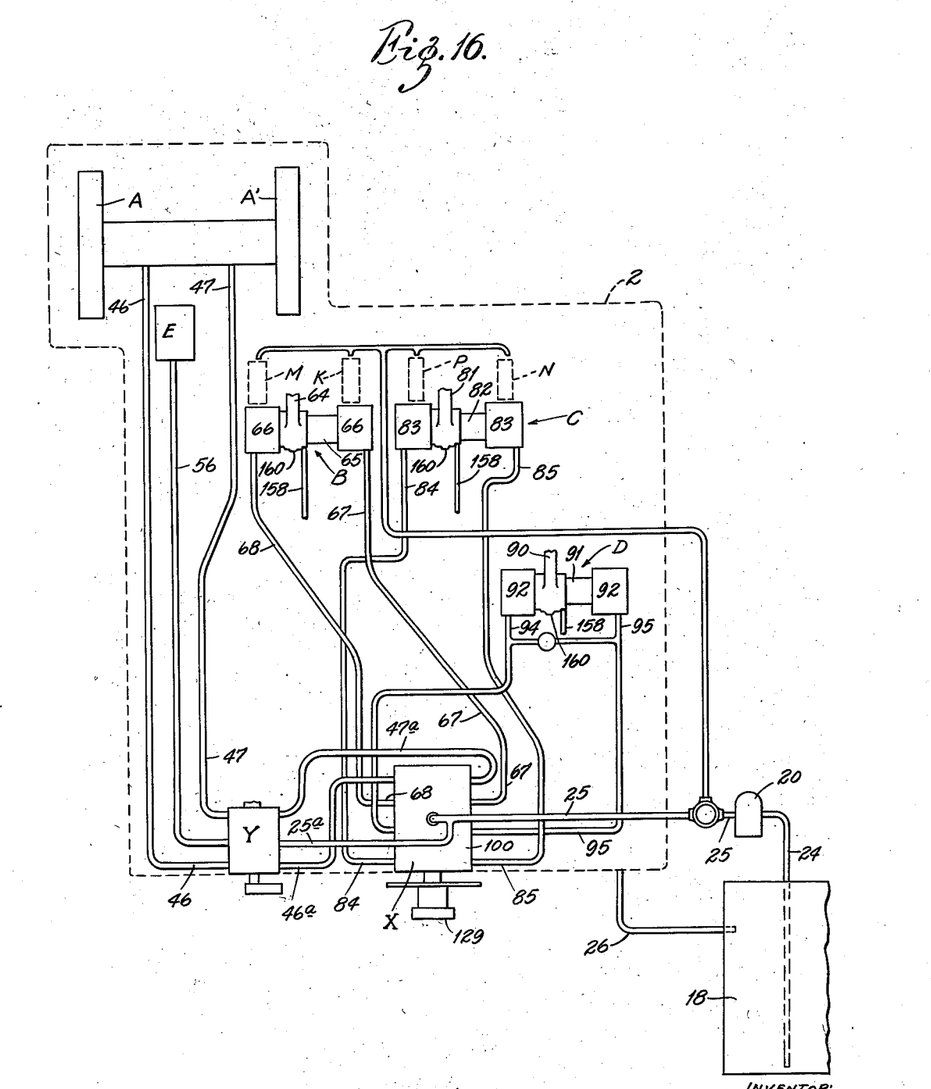
Fig. 16 is a diagrammatic view illustrating the connections between the valves and clutches of the fluid operated change speed transmission.

The change speed mechanism enclosed within the headstock housing 2 comprises four horizontally spaced parallel shafts; namely, a main or primary drive shaft 7, a countershaft 8, a second countershaft comprising sections 9 and 9a, and a final driven shaft or spindle 10, which carries at its forward end the usual chuck or face plate (not shown) for supporting the work or stock that is to be operated upon. The drive shaft 7 is provided at its rear end with a drive pulley 12 and its forward end is operatively connected by gearing 13 to a vertical shaft 14 that is connected by gearing enclosed in a housing 16 with a rotary pump 20 mounted on a lubricant supply tank 18 located below the headstock housing 2. As shown in Fig. 16, a pipe 24 leads from the bottom of the tank 18 to the pump 20, a pipe 25 leads from said pump for supplying lubricant to the headstock housing 2 and to various pressure responsive devices hereinafter described, and an overflow pipe 26 leads from the lower portion of said housing to said tank for returning the lubricant thereto.

The gearing of the change speed transmission mechanism comprises gears F and H fixed to the remote ends of a pair of sleeves 32 that surround the primary or main drive shaft 7 and are mounted for independent rotary and axial sliding movement in a fixed bearing 33. The gears F and H intermesh continuously with gears G and I, respectively, fixed to the countershaft 8. Gears L and J are also fixed to the countershaft 8 and intermesh continuously with gears M and K, respectively, journaled on the rear section 9 of the sectional countershaft. A third gear P is mounted for rotation on the rear section 9 of the sectional countershaft and intermeshes continuously with a gear Q rotatable on the spindle 10. Gears N and R are fixed to the forward section 9a of the sectional countershaft and intermesh continuously with gears O and S, respectively, rotatable on the spindle 10. As shown in the drawings, the gears O and Q are integrally connected to constitute a double gear.

The change speed transmission is provided with two primary clutches A and A', and three secondary clutches B, C and D all adapted to be selectively operated by fluid pressure under manual control to obtain the desired spindle speeds. As shown in said application Serial No. 721,974, the primary clutches A and A' are friction disk clutches and the secondary clutches B, C and D are interlocking or positively engaged clutches. The gears H and F are coupled to the drive shaft 7 for rotation therewith by means of the friction disk clutches A and A', respectively. The clutches A and A' are selectively engaged to force the gears H and F, respectively, to rotate with the drive shaft 7 by the pressure of oil supplied through separate pipes 46 and 47 to the chambers 44 of the respective clutches. The clutches are automatically disengaged by springs (not shown) when the pressure is relieved in the chambers 44.

Figures 3, 4:
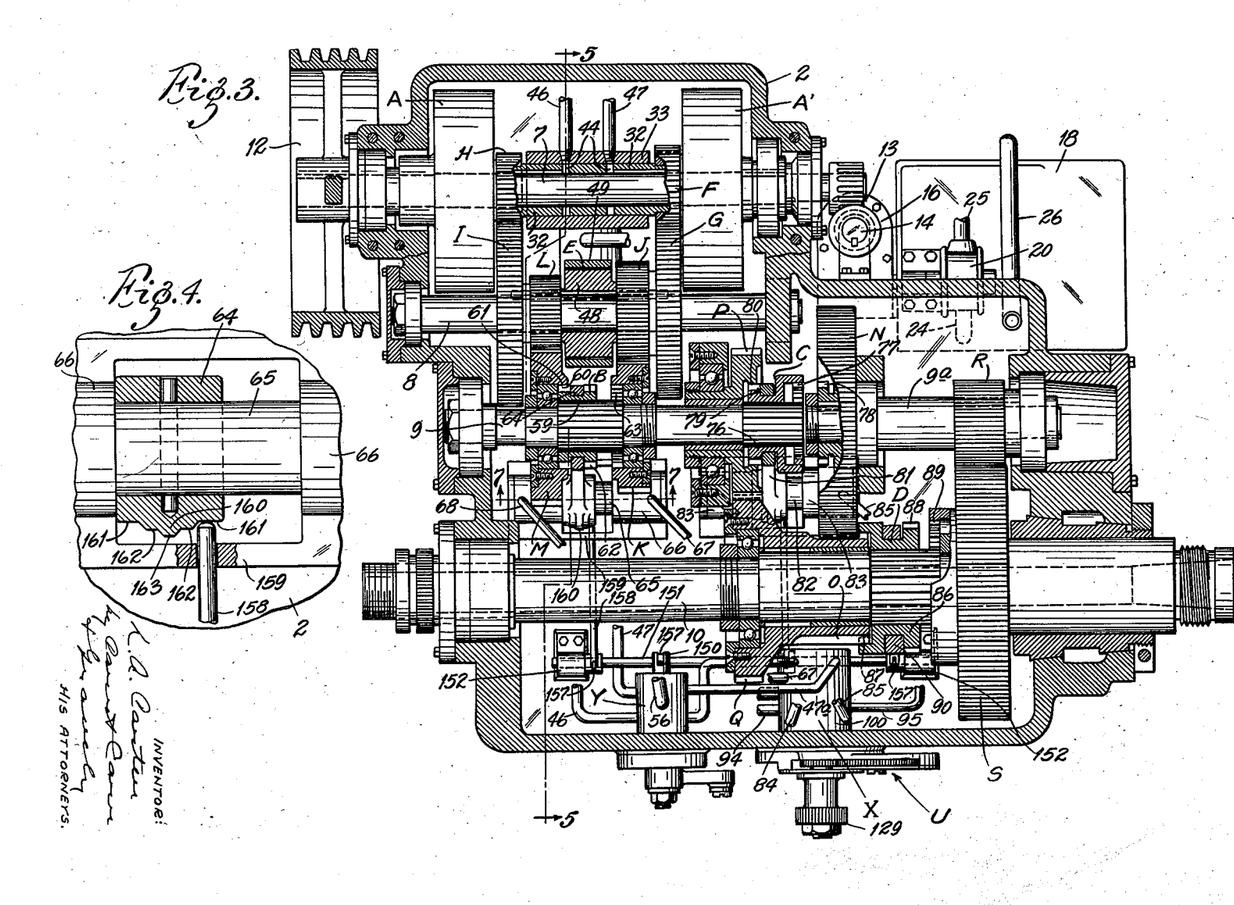
Fig. 3 is a horizontal section through the headstock approximately on the line 3—3 in Fig. 1.
Fig. 4 is a fragmentary section on the line 4—4 in Fig. 5.
Figures 5, 6, 7, 8, 9:
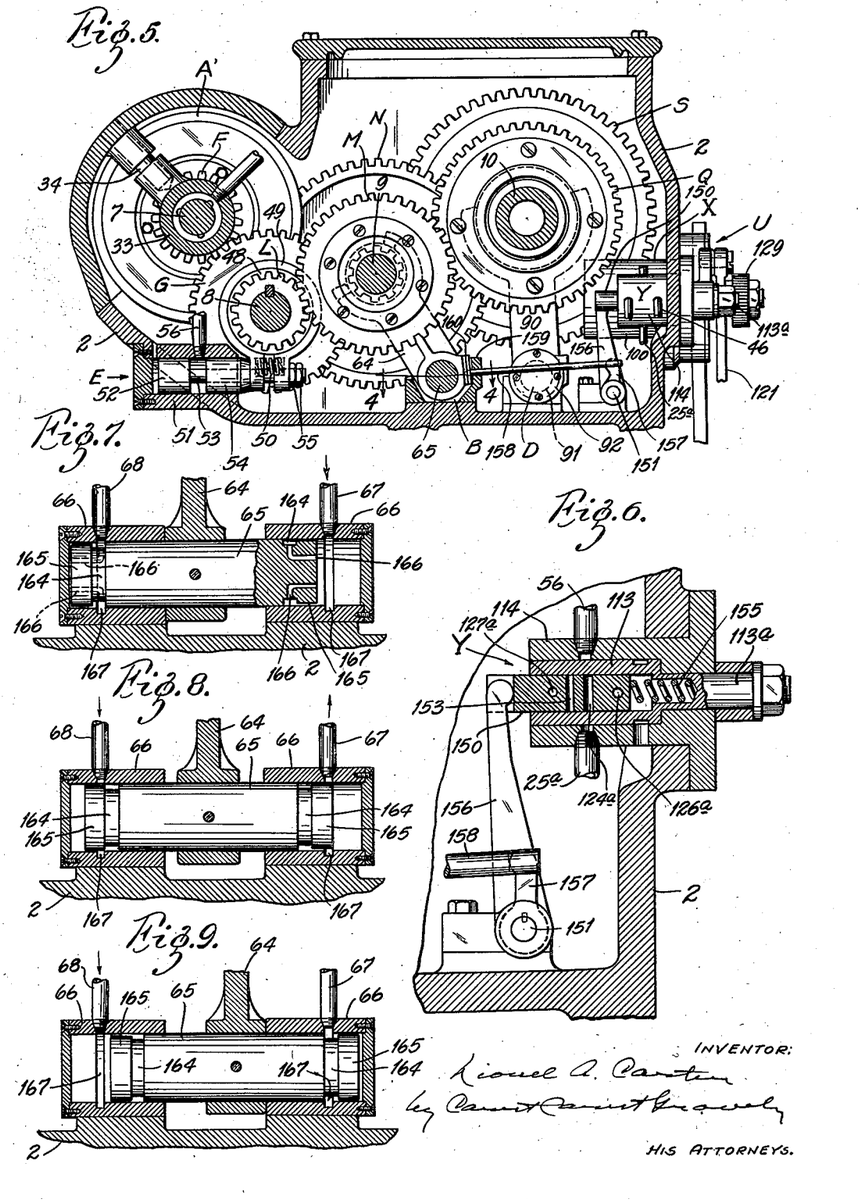

As shown in Figs. 3, 5 and 16, the countershaft 8 is provided with a fluid operated brake mechanism E comprising a collar 48, which is fixed to said shaft intermediate between the gears L and J thereon, and a split brake band 49 adapted to frictionally engage the periphery of said collar. The brake band 49 is normally held in released position by means of a coil spring 50 interposed between the split ends thereof. The brake is applied by means of a double piston mounted in a cylinder 51 formed integral with the headstock housing 2. One member 52 of this double piston is provided with a rod 53 which extends through the other member 54 thereof and through alined openings provided therefor in the ends of the brake band 49 and is provided at its end with nuts 55. Pressure exerted by the spring 50 forces the pistons 52 and 54 toward each other and spreads the brake band. Oil is supplied to the cylinder 51 between the adjacent inner ends of the pistons 52 and 54 by means of a pipe 56, thereby forcing said pistons apart and thus causing the brake band 49 to grip the collar 48 fixed to the countershaft 8 and thus stop rotation thereof.

The gears M and K are selectively clutched to the countershaft section 9 to rotate the same by the fluid operated positive clutch mechanism B which comprises a clutch sleeve 59 that is slidably splined on said shaft intermediate between said gears. The sliding clutch member 59 is provided on the end nearest the gear M with external clutch teeth 60 adapted to cooperate with internal clutch teeth 61 formed on said gear; and the other end of said clutch member is likewise provided with external clutch teeth 62 adapted to engage internal clutch teeth 63 on the gear K. The sliding clutch member 59 is actuated by means of a shifter fork 64 having its hub fixed to a piston 65 whose ends are slidably supported in cylinders 66. As shown in Figs. 3, 5 and 16, the clutch 59 is shifted into engagement with the gear M by oil supplied through a pipe 67 to the inner end of the right hand cylinder; and oil supplied to the left hand cylinder through a pipe 68 shifts said clutch into engagement with the gear K.

The two sections 9 and 9a of the sectional countershaft are connected to rotate together by means of the fluid operated clutch mechanism C, which comprises a clutch sleeve 76 that is slidably splined on the forward end of the rear section 9 of said shaft between the gears P and N. This sliding clutch member is provided at its forward end with internal clutch teeth 77 adapted to be engaged with external clutch teeth 78 formed on the gear N; and the rear end of said clutch member is provided with external clutch teeth 79 adapted to be clutched with internal clutch teeth 80 formed in the gear P. The clutch 76 is operated by a shifter fork 81 fixed to a piston 82 whose ends are mounted in cylinders 83 located in the bottom of the headstock housing. As shown in Fig. 16, said clutch is shifted into engagement with gear N by means of oil supplied to the left-hand cylinder through a pipe 84 and is shifted into engagement with the gear P by oil supplied to the right-hand cylinder through a pipe 85.

The fluid operated clutch mechanism D comprises a clutch sleeve 86, which is slidably splined on the spindle 10 between the double gear O, Q and the gear S, and is provided at its rear end with internal clutch teeth 87 adapted to engage the gear O and at its forward end with external clutch teeth 88 adapted to interlock with internal clutch teeth 89 formed on the gear S. The clutch sleeve 86 is actuated by means of a shifter fork 90 having its hub fixed to a piston 91 whose opposite ends are slidably mounted in cylinders 92 provided therefor in the bottom of the housing 2. The clutch sleeve 86 is clutched with the spindle gear S by means of oil pressure supplied to the left hand cylinder by means of a pipe 94; and the piston is shifted in the opposite direction to cause the spindle to rotate with the double gear O, Q by means of oil supplied to the right-hand cylinder through a pipe 95.

Figure 1:
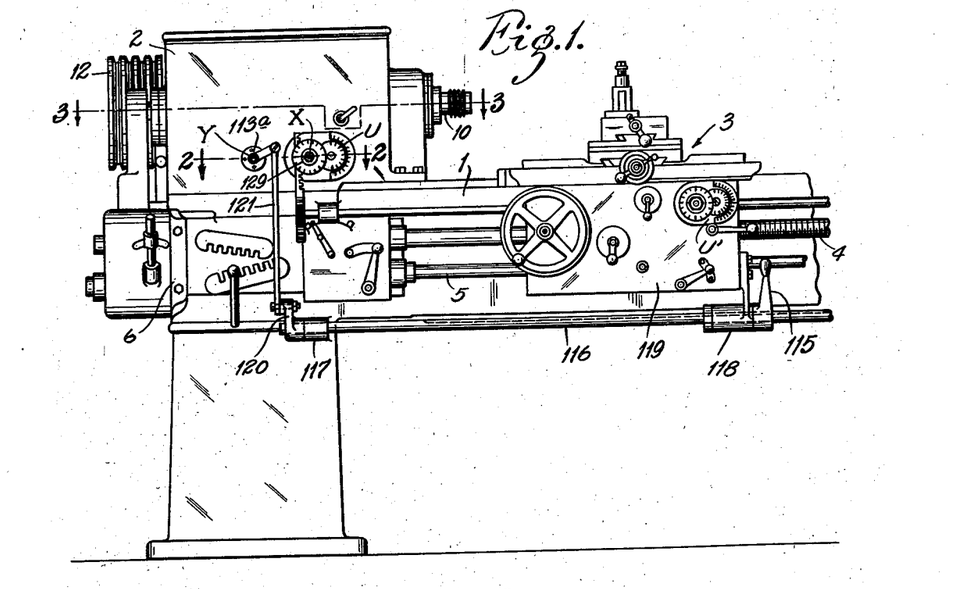
Fig. 1 is a front view of a portion of a lathe having a geared headstock provided with a fluid operated change speed transmission embodying my invention.
Figure 2:
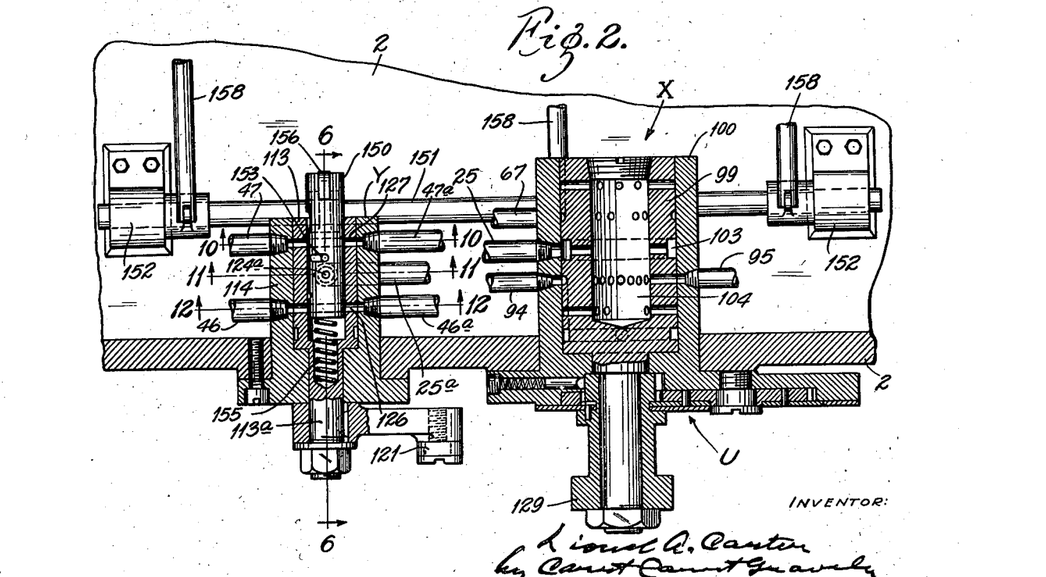
Fig. 2 is a fragmentary horizontal section through the front wall of the headstock, the section being taken through the control valve and the start-and-stop valve, on the line 2—2 in Fig. 1.

The hereinbefore described arrangement of shafts, clutches and gears provides sixteen spindle speeds which are obtained by a corresponding number of angular adjustments of a single rotary control valve X which control the admission and discharge of the oil in the cylinders for the various clutches. As shown in Figs. 1 and 2, the control valve X comprises a core 99 that is rotatably mounted in a casing 100 mounted in the front wall of the headstock 2. As shown in Fig. 16, the oil is supplied to the control valve through the pipe 25 leading from the pump 20. As shown in Fig. 2, oil flowing through the pipe 25 from the pump 20 enters an annular groove 103 in the periphery of the valve core 99 and thence passes into a chamber 104 where it is delivered to the clutches A, A', B, C and D and brake mechanism E through the different pipes hereinafter referred to. This control valve is shown and fully described in my copending application Serial No. 721,974 and reference is hereby made to such description.

The core 99 of the speed control valve X is provided with an operating knob 129; and the rotary movement of said valve core operates suitable devices U and U' mounted on the head stock and carriage apron, respectively for setting said valve to obtain the approximate circumferential cutting speed required for the work and for indicating and checking said speed. This setting and indicating device is claimed and fully described in my copending application Serial No. 721,974 and reference is hereby made to such description.

The above change speed transmission is started and stopped by means of a manually operable valve Y located in the pipes 46 and 47 leading to the friction clutches A and A'. Said valve comprises a cylindrical valve sleeve 113 rotatable in a casing 114 that is mounted in the front side wall of the headstock housing 2 adjacent to the control valve X. The cylindrical valve sleeve 113 is preferably rotated by means of a handle 115 that is fixed to a rock shaft 116 journaled in the bearings 117 and 118 provided therefor in the lathe bed 1 and the carriage apron 119, respectively, and is provided with an arm 120 that has a link connection 121 with an arm fixed to an axial stud 113a on the closed outer end of said valve sleeve 113.

Figure 10:
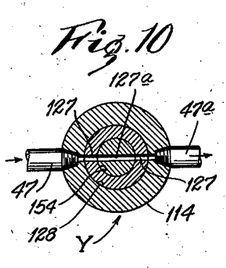
Figs. 10, 10a, 10b and 10c are cross-sections through the stop-and-start valve on the line 10—10 in Fig. 2 at the points of communication between said valve and the pipes leading to the low speed primary shaft clutch, the rotary valve sleeve being shown in start position in Figs. 10, 10a and 10b and in stop position in Fig. 10c, and the axially slidable valve core being shown in its outermost position in Figs. 10 and 10c, in its innermost position in Fig. 10b and in its intermediate position in Fig. 10a, Figs. 11, 11a, 11b and 11c are similar cross-sections through said valve, the sections being taken on the line 11—11 in Fig. 2 at the points of communication between said valve and the pipes leading to the countershaft brake actuating mechanism.
Figure 10A:
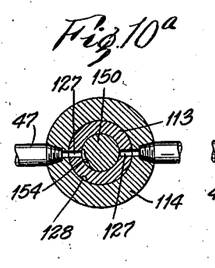
Figure 11:
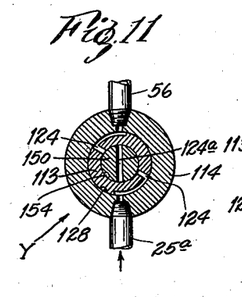
Figure 12:
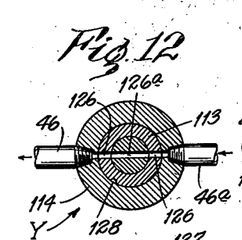
Figs. 12, 12a, 12b and 12c are similar cross-sections through said valve on the line 12—12 in Fig. 2 at the points of communication between said valve and the pipes leading to the high speed primary shaft clutch.
Figure 12A:
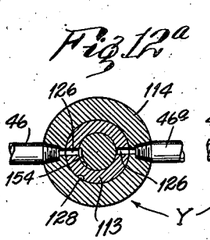

As shown in Figs. 11 and 16, the pipe 25 leading from the pump 20 to the speed control valve X has a branch 25a adapted, in the stop position of the start-and-stop valve Y, to communicate through diametral ports 124 and 124a, respectively, in the valve sleeve 113 and a core 150 therein with the pipe 56 that leads to the brake operating mechanism E. As shown in Fig. 12, said sleeve and core are also provided with diametral ports 126 and 126a, respectively, adapted to establish communication between said speed control valve and the primary clutch A through the pipes 46 and 46a. As shown in Fig. 10, said sleeve and core are also provided with diametral ports 127 and 127a, respectively, adapted to establish communication with the speed control valve and the primary clutch A' through the pipes 47 and 47a. The outer periphery of the valve sleeve is provided with a longitudinal exhaust groove 128 adapted, in the stop position of the valve Y, to be brought into communication with the pipes 46 and 47 leading from the primary friction clutches A and A', respectively.

When the start-and-stop valve Y is in start position, as shown in Figs. 10, 10a, Figs. 11, 11a and 11b and Figs. 12, 12a and 12b the pipe 56 leading to the braking mechanism E is cut off from the pipe 25a (see Fig. 11), thus releasing the brake; and communication is established between the speed control valve X and the clutches A through the ports 126, 126a (see Fig. 12) and between said control valve and the clutch A' through the ports 127, 127a (see Fig. 10) and one of said clutches is engaged and the other released, depending upon the position of said control valve. When the start-and-stop valve is rotated sixty degrees to the right to stop position, as shown in the last cross-sections in Figs. 10c, 11c, and 12c, flow of the oil to the clutches A and A' is cut off and the pipes 46 and 47 are open to exhaust (see Figs. 12c and 10c respectively) through the exhaust port 128, thereby relieving the pressure on the clutches A and A' and thus preventing operation thereof; and oil is supplied to the brake mechanism E to apply the brake (see Fig. 11c) through the pipe 25a, ports 124, 124a and pipe 56.

Figures 10B, 10C:
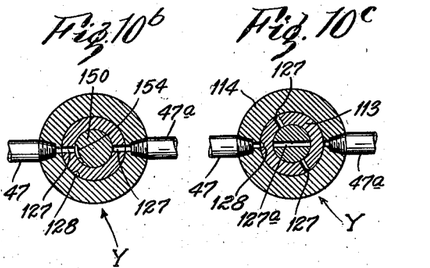
Figures 11A, 11B, 11C:
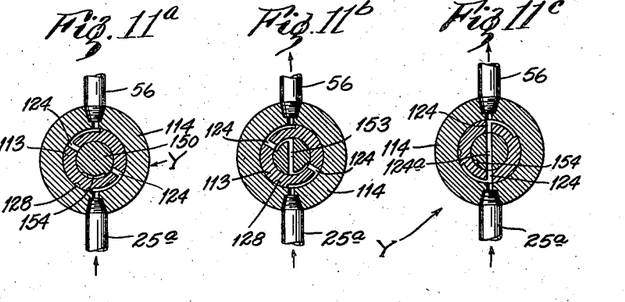
Figures 12B, 12C:
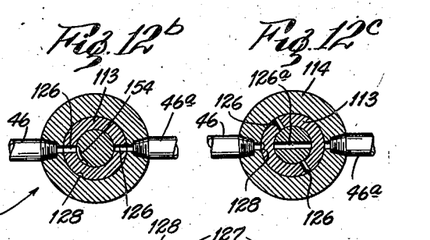
Figure 13:
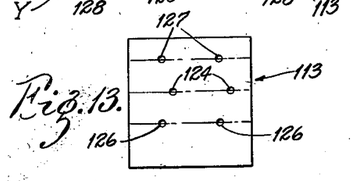
Fig. 13 is a diagrammatic view showing a development of the inside surface of the rotary valve sleeve of the start-and-stop valve.
Figure 15:
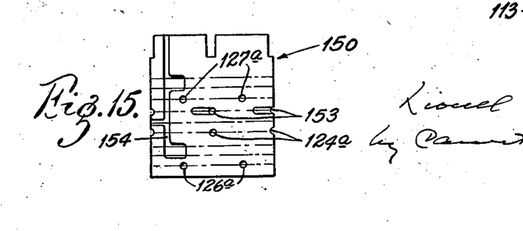
Fig. 15 is a diagrammatic view showing a development of the outer peripheral surface of the axially slidable core of the start-and-stop valve.

With the fluid operated change speed mechanism thus far described, the operator is liable to manipulate the speed control valve X to effect speed changes while the start-and-stop valve Y is in start position, thereby causing clashing of the positive clutches B, C and D and consequent damage to the transmission. Accordingly, means are provided for enabling the desired speed changes to be quickly, easily and safely made without requiring the start-and-stop valve Y to be manually moved to stop position. Said means comprises a horizontal rock shaft 151 journaled in suitable bearings 152 provided therefor in the bottom of the headstock housing 2 and extending longitudinally of said housing below the inner end of the start-and-stop valve Y and opposite the three fluid operated clutch mechanisms B, C and D. The core 150 of the start-and-stop valve is axially slidable but nonrotatably mounted in the rotary valve sleeve 113 and is provided with a diametral port 153, which is located between the two diametral ports 124a and 127a, and with a longitudinal peripheral exhaust groove 154 that extends (see Fig. 15) from a point located near the innermost diametral ports 126a to the outer end of said core. A helical compression spring 155 is located in said sleeve between the inner end of its bore and the adjacent end of said core so as to force the core outwardly in said bore. Fixed to the rock shaft 151 is an upright arm 156 whose free upper end is engaged by the outer end of the spring pressed valve core 150. The rock shaft has separate connections with the fluid operated positive clutch mechanisms B, C and D. Each of said connections comprises an upwardly extending rock arm 157 fixed to the rock shaft with its upper end bearing against the adjacent end of a slide rod 158, which is slidably supported in a bracket 159 provided therefor in the housing 2 and has its other end rounded and disposed in abutting relation to a cam 160 formed on the opposing peripheral face of the hub of the clutch shifter fork of the particular clutch mechanism. As shown in Fig. 4, this cam extends from end to end of the hub and comprises end steps 161, intermediate steps 162 and a middle or top step 163. With this construction of cam, when any one of the positive clutches is engaged with the gear member at either end thereof, the rod 158 is engaged with one of the end steps 161 of the cam and the core 150 of the valve Y is in the outermost of its three longitudinal movable positions. In this outermost position of the core, when the start-and-stop valve is in start position, the parts are in the position shown in Figs. 2, 6, 10, 11 and 12, and all of the fluid operated devices of the transmission are under the control of the main control valve X. With the parts in this position, operation of said control valve to effect a speed change actuates at least one of the positive clutch devices B, C and D and causes the stepped cam 160 on the hub of the shifter fork of said clutch device to move across the end of the rod 158 associated therewith and bring the intermediate step 162 of said cam into engagement with said rod before the clutch is disengaged, thereby moving the valve core 150 axially in the valve sleeve 113 to the position shown in Figs. 10a, 11a and 12a. In this position of the valve core 150, the pipes 46 and 47 leading to the friction clutches A and A', respectively, are exhausted through the longitudinal groove 154 and said clutches are automatically disengaged, thereby relieving the positive clutch of driving torque and thus facilitating disengagement thereof. After a relatively short movement of the cam 160, the middle step 163 thereof shifts the core 150 endwise into its farthest innermost position, as shown in Figs. 10b, 11b and 12b. In this position of the valve core 150, the two friction clutches are still disengaged (see Figs. 10b and 12b); and the pipe 25a is placed in communication, with the pipe 56 leading to the brake mechanism E through the ports 124 and 153 (see Fig. 11b) so that pressure is applied to said brake mechanism to apply the brake 49 to the countershaft 8 in the completely disengaged position of the positive clutch. Continued movement of the cam 160 in the same direction causes the other intermediate step 162 to engage the rod 158 and disengage the brake 49 before the other end of the positive clutch engages with the gear adjacent thereto; and the friction clutches A, A' have enough drifting action to revolve said gear at a relatively low speed and with slight torque, thereby facilitating the re-engagement of the positive clutch. When the positive clutch is re-engaged, the rod 158 is in contact with the other end step 162 and the core 150 is moved to the position shown in the Figs. 10, 11 and 12 to again throw in the friction clutches.

In the stop position of the start-and-stop valve Y, as shown in Figs. 10c, 11c and 12c, the pipes 46 and 47 are exhausted through the exhaust port 128, thereby releasing the two friction clutches, and the pipe 25a is placed in communication with the pipe 56 through the registering ports 124 and 124a, thereby permitting the fluid pressure to reach the cylinder 51 and apply the brake 49. If, in this stop position of the valve Y, the control valve X is actuated to set the transmission mechanism for a different speed, the movement of the cam 160 associated with the selective positive clutch will release the brake 49 while said clutch is being disengaged from one gear, apply the brake after the clutch is completely disengaged, and again release the brake while the clutch is being engaged with the other gear which is slowly rotated by the drifting action of the friction clutches and thus facilitates the engagement of the clutch therewith. The brake is released during the disengaging and engaging movements of the positive clutch by the intermediate steps 162 of the cam 160 which cause the valve core 150 to slide axially in the valve sleeve 113 and cut off communication between the pipes 25a and 56. Application of the brake during the release position of the positive clutch is brought about by the middle step 163 of the cam 160 which shifts the valve core axially to bring the port 156 therein in register with the ports 124 and thus establishes communication between the pipes 25a and 56.

To facilitate engagement and disengagement of the positive clutches B, C and D it is desirable to effect a relatively fast movement of the clutches from engaged to disengaged position and a relatively slow movement after disengagement to permit effective and easy functioning of the brake until they are disengaged and the brake is applied. Accordingly, the piston of each positive clutch device (see Figs. 7, 8 and 9) is provided near each end with an annular groove 164 and between said annular groove and the adjacent end of said piston with a portion 165 of less diameter than the intermediate portion of the piston. Each end of the piston is also provided with ports 166, which communicate at their inner ends with the annular groove 164 and at their outer ends with the space between the end of the cylinder and the end of the piston. An annular groove 167 is also provided at the inner periphery of each cylinder in communication with the pipe leading thereto. With this arrangement, with the parts in the position shown in Fig. 7, the clutch B is disengaged from the gear M by oil supplied through the pipe 68 to the groove 167 in the piston and thence around the reduced end portion 165 of the piston and through the ports 166 to the space between the corresponding ends of the piston and cylinder, thereby causing the piston to move rapidly to the right and quickly disengage the clutch B. Upon disengagement of the clutch, the reduced end portion 165 of the piston arrives opposite the annular groove 167 in the cylinder, thus cutting down the supply of fluid to the end of the cylinder and causing the piston to travel very slowly while the brake is being applied. This slow movement of the piston continues until the opposite end of the clutch engages the gear K, at which time the reduced end portion 165 of the piston clears the annular groove 167 and the pipe 68 opens directly into the cylinder thus imparting a rapid movement to the piston and bringing about a quick engagement of said clutch with said gear.

The hereinbefore described fluid operated change speed transmission has many advantages. When the control valve is operated to effect a speed change in the start position of the start-and-stop valve, the friction or primary clutches are automatically disengaged while the selected positive or secondary clutch is being disengaged and engaged and the brake is automatically applied when said clutch is completely disengaged, thus making it unnecessary to manually move the start-and-stop valve Y to stop position whenever a speed change is desired. When the control valve is operated in the stop position of the start-and-stop valve to set the mechanism for a different speed, the brake is automatically released during the disengaging and engaging movements of the selected positive clutch and is automatically applied in the complete disengaged position of said clutch. The construction also provides a relatively rapid movement of the positive clutches while they are being engaged and disengaged and relatively slow movement of said clutches when they are disengaged and the brake is applied. Thus, favorable conditions are created for enabling the positive clutches to be quickly, easily, silently and safely operated whether the start-and-stop valve is set at either start or stop position.

Obviously, numerous changes may be made without departing from the invention. Therefore, I do not wish to be limited to the precise construction shown and described.

What I claim is:

1. In a change speed transmission having a primary clutch, a secondary clutch, a manually operable control member for selectively operating said clutches, a manually operable start-and-stop device adapted in the stop position thereof to prevent operation of said primary clutch by said control member, and means arranged to permit disengagement of said primary clutch when said control member is operated in the start position of said start-and-stop device to disengage said secondary clutch.

2. In a change speed transmission having a primary clutch, a plurality of secondary clutches, a manually operable control member for selectively operating said clutches, a manually operable start-and-stop device adapted in the stop position thereof to prevent operation of said primary clutches by said control member, and means arranged to permit disengagement of said primary clutch when said control member is operated in the start position of said start-and-stop device to disengage any one of said secondary clutches.

3. In a change speed transmission having a friction clutch, a positive clutch, a manually operable control member for selectively operating said clutches, a manually operable start-and-stop device adapted in the stop position thereof to prevent operation of said friction clutch by said control member, and means arranged to permit disengagement of said friction clutch when said control member is operated in the start position of said start-and-stop device to disengage said positive clutch.

4. In a change speed transmission having a fluid operated primary clutch, a fluid operated secondary clutch, a control valve for selectively operating said clutches, a manually operable start-and-stop valve adapted in the stop position thereof to prevent operation of said primary clutch by said control valve, and means associated with said start-and-stop valve to automatically disengage said primary clutch when the secondary clutch is being actuated in the start position of said start-and-stop valve.

5. In a change speed transmission having a plurality of fluid operated friction clutches, a plurality of fluid operated positive clutches, a control valve for selectively operating said clutches, a manually operable start-and-stop valve adapted in the stop position thereof to prevent operation of said friction clutches by said control valve, and means associated with and operable in the start position of said start-and-stop valve to automatically disengage said primary clutch whenever any one of said positive clutches is being actuated by said control valve.

6. In a change speed transmission having a fluid operated friction clutch, a fluid operated positive clutch, a control valve for selectively operating said clutches, a manually operable start-and-stop valve adapted in the stop position thereof to prevent operation of said friction clutch by said control valve, and means associated with and operable in the start position of said start-and-stop valve to automatically disengage said friction clutch when said positive clutch is being actuated by said control valve.

7. In a change speed transmission having a fluid operated primary clutch, a fluid operated secondary clutch, a manually operable control valve for selectively operating said clutches, a manually operable start-and-stop valve adapted in the stop position thereof to prevent operation of said primary clutch by said control valve, and means whereby when the secondary clutch is actuated by the control valve in the start position of the start-and-stop valve the movement of the secondary clutch will bring about the disengagement of the primary clutch when the secondary clutch is disengaged and while it is being engaged and disengaged.

8. In a change speed transmission having a fluid operated friction primary clutch, a fluid operated positive secondary clutch, a manually operable control valve for selectively operating said clutches, a manually operable start-and-stop valve adapted in the stop position thereof to prevent operation of said friction clutch by said control valve, and means whereby when the positive clutch is actuated by the control valve in the start position of the start-and-stop valve the movement of the positive clutch will bring about the disengagement of the friction clutch when the positive clutch is disengaged and while it is being engaged and disengaged.

9. In a change speed transmission having a fluid operated primary clutch, a fluid operated secondary clutch, a fluid operated brake, a manually operable control valve for selectively operating said clutches, a manually operable start-and-stop valve adapted in the stop position thereof to bring about the application of said brake and the disengagement of said primary clutch, and means whereby the operation of said secondary clutch by said control valve in the start position of said start-and-stop valve will bring about the disengagement of said primary clutch while the secondary clutch is being engaged and disengaged and when it is disengaged and will cause the brake to be applied when the secondary clutch is completely disengaged.

10. In a change speed transmission having a fluid operated friction primary clutch, a fluid operated positive secondary clutch, a fluid operated brake, a manually operable control valve for selectively operating said clutches, a manually operable start-and-stop valve adapted in the stop position thereof to bring about the application of said brake and the disengagement of said friction clutch, and means whereby the operation of said positive clutch by said control valve in the start position of said start-and-stop valve will bring about the disengagement of the friction clutch while the positive clutch is being engaged and disengaged and when it is disengaged and will cause the brake to be applied when the positive clutch is completely disengaged, and whereby when the positive clutch is actuated by the control valve in the stop position of the start-and-stop valve the movement of the positive clutch will bring about the release of the brake when the positive clutch is being engaged and disengaged.

11. In a change speed transmission having a plurality of fluid operated friction primary clutches, a plurality of fluid operated positive secondary clutches, a fluid operated brake, a manually operable control valve for selectively operating said clutches, a manually operable start-and-stop valve adapted in the stop position thereof to bring about the application of said brake and the disengagement of said friction clutches, and means whereby the operation of any one of said positive clutches by said control valve in the start position of said start-and-stop valve will bring about the disengagement of said friction clutches while said positive clutch is being engaged and disengaged and when it is disengaged and will cause the brake to be applied when said positive clutch is completely disengaged, and whereby when said positive clutch is actuated by the control valve in the stop position of the start-and-stop valve the movement of said positive clutch will bring about the release of the brake when said positive clutch is being engaged and disengaged.

12. In a change speed transmission having a fluid operated friction primary clutch, a fluid operated double acting positive secondary clutch arranged between and adapted to be interlocked with either one of two elements of said transmission, a fluid operated brake, a manually operable control valve for selectively operating said clutches, a manually operable start-and-stop valve adapted in the stop position thereof to bring about the application of said brake and the disengagement of said primary clutch, means whereby the operation of said positive clutch by said control valve in the start position of said start-and-stop valve will bring about the disengagement of the friction clutch while the positive clutch is being engaged and disengaged and when it is disengaged and will cause the brake to be applied when the positive clutch is completely disengaged, and means for causing a relatively rapid movement of said positive clutch when it is being engaged and disengaged with either of the elements associated therewith and a relatively slow movement while it is moving from one element to the other.

13. In a change speed transmission having a fluid operated friction primary clutch, a fluid operated positive secondary clutch, a control valve for selectively operating said clutches, a manually operable start-and-stop valve adapted in the stop position thereof to prevent operation of said friction clutch by said control valve, and a core axially slidable in said valve and arranged in the start position of the start-and-stop valve to cause disengagement of said friction clutch while said positive clutch is being engaged and disengaged and when it is disengaged.

14. In a change speed transmission having a fluid operated friction primary clutch, a fluid operated positive secondary clutch, a control valve for selectively operating said clutches, a fluid operated brake, a manually operable start-and-stop valve adapted in the stop position thereof to prevent operation of said friction clutch by said control valve, and a core axially slidable in said valve and arranged in the start position of the start-and-stop valve to cause disengagement of said friction clutch while said positive clutch is being engaged and disengaged and when it is disengaged, and to apply said brake in said disengaged position of said positive clutch.

15. In a change speed transmission having a fluid operated friction primary clutch, a fluid operated positive secondary clutch, a fluid operated brake, a control valve for selectively operating said clutches, a manually operable start-and-stop valve adapted in the stop position thereof to prevent operation of said friction clutch by said control valve, and a core axially slidable in said valve and arranged in the start position of the start-and-stop valve to cause disengagement of said friction clutch while said positive clutch is being engaged and disengaged and when it is disengaged, and to apply said brake in such disengaged position of said positive clutch, said core being also arranged in the stop position of said start-and-stop valve to cause the release of said brake when said positive clutch is being engaged and disengaged.

16. In a change speed transmission having a fluid operated friction primary clutch, a fluid operated positive secondary clutch, a fluid operated brake, a control valve for selectively operating said clutches, a manually operable start-and-stop valve adapted in the stop position thereof to prevent operation of said friction clutch by said control valve, and a core axially slidable in said valve and arranged in the start position of the start-and-stop valve to cause disengagement of and friction clutch while said positive clutch is being engaged and disengaged and when it is disengaged, and to apply said brake in such disengaged position of said positive clutch, said core being also arranged in the stop position of said start-and-stop valve to cause the release of said brake when said positive clutch is being engaged and disengaged, and a cam movable with said positive clutch and operatively connected to said core to actuate the same.

17. In a change speed transmission having a fluid operated friction primary clutch, a fluid operated positive secondary clutch, a fluid operated brake, a control valve for selectively operating said clutches, a manually operable start-and-stop valve adapted in the stop position thereof to prevent operation of said friction clutch by said control valve, and a core axially slidable in said valve and arranged in the start position of the start-and-stop valve to cause disengagement of said friction clutch while said positive clutch is being engaged and disengaged and when it is disengaged, and to apply said brake in such disengaged position of said positive clutch, said core being also arranged in the stop position of said start-and-stop valve to cause the release of said brake when said positive clutch is being engaged and disengaged, and a cam movable with said positive clutch and operatively connected to said core to actuate the same, the operative connection between said cam and said core comprising a rod arranged to be shifted axially by said cam, a rock shaft extending transversely of said core, an arm fixed to said shaft and connected to said rod, and an arm fixed to said shaft with its free end disposed opposite to the outer end of said core, and a spring for holding said core in engagement with said last mentioned arm.

18. In a change speed transmission having a fluid operated friction primary clutch, two clutch elements, a double acting fluid operated positive secondary clutch adapted to be clutched with either of said elements, a single control valve for selectively operating said clutches, a second valve for rendering said friction clutch inoperative by said control valve, said fluid operated positive clutch including a cylinder, a double acting piston in said cylinder and operatively connected to said positive clutch to actuate the same, and means controlling the pressure on said piston to cause a relatively rapid movement at the beginning and end of its stroke and a relatively slow movement intermediate therebetween, whereby said positive clutch is engaged and disengaged rapidly and moves slowly from one clutch element to the other.

19. In a change speed transmission having a fluid operated friction primary clutch, two clutch elements, a double acting fluid operated positive secondary clutch adapted to be clutched with either of said elements, a single control valve for selectively operating said clutches, a second valve for rendering said friction clutch inoperative by said control valve, said fluid operated positive clutch including a cylinder, a double acting piston in said cylinder and operatively connected to said positive clutch to actuate the same, and means controlling the pressure on said piston to cause a relatively rapid movement at the beginning and end of its stroke and a relatively slow movement intermediate therebetween, whereby said positive clutch is engaged and disengaged rapidly and moves slowly from one clutch element to the other, said means comprising a ported annular groove in said cylinder near each end thereof, an annular groove in said piston at the inner end of a reduced end thereof, and ports leading from the annular piston groove to the space between ends of said cylinder and piston.

20. In a change speed transmission having a disengageable primary power transmission device, a disengageable secondary power transmission device, a manually operable control member for selectively operating said power transmission devices, a manually operable start-and-stop device adapted in the start position thereof to prevent operation of said primary power transmission device by said control member, and means arranged to permit disengagement of said primary power transmission device when said control member is operated in the start position of said start-and-stop device to disengage said secondary power transmission device.

21. In a change speed transmission having disengageable fluid pressure actuated change speed primary and secondary power transmission devices, a fluid pressure system for operating said devices, a manually operable control valve in said system for selectively operating said power transmission devices, a manually operable start-and-stop valve in said system adapted in the stop position thereof to prevent operation of said primary power transmission device by said control member, and means arranged to permit disengagement of said primary power transmission device when said control valve is operated in the start position of said start-and-stop valve to disengage said secondary power transmission device.

LIONEL A. CARTER.

Certificate of Correction

Patent No. 2,050,245.  August 11, 1936.

LIONEL A. CARTER

It is hereby certified that errors appear in the printed specification of the above numbered patent requiring correction as follows: Page 3, first column, line 68, for "10a" read *10a and 10b*; page 6, second column, line 11, claim 16, for "and" read *said*; and that the said Letters Patent should be read with these corrections therein that the same may conform to the record of the case in the Patent Office.

Signed and sealed this 3d day of November, A. D. 1936.

[SEAL]

HENRY VAN ARSDALE,
*Acting Commissioner of Patents.*